June 12, 1928.

W. A. KOSKEN 1,673,252

ART OF MOTION PICTURES

Original Filed Sept. 13, 1924    7 Sheets-Sheet 1

INVENTOR.
Wilho A. Kosken
BY Jas. H. Griffin
ATTORNEYS.

June 12, 1928.  
W. A. KOSKEN  
1,673,252  
ART OF MOTION PICTURES  
Original Filed Sept. 13, 1924  7 Sheets-Sheet 2

INVENTOR.  
Wilho A. Kosken  
BY Jas. H. Griffin  
ATTORNEYS.

June 12, 1928. 1,673,252
W. A. KOSKEN
ART OF MOTION PICTURES
Original Filed Sept. 13, 1924  7 Sheets-Sheet 3

INVENTOR.
Wilho A. Kosken
BY
ATTORNEYS.

June 12, 1928.

W. A. KOSKEN 1,673,252

ART OF MOTION PICTURES

Original Filed Sept. 13, 1924    7 Sheets-Sheet 4

INVENTOR.
Wilho A. Kosken
BY
ATTORNEYS.

June 12, 1928.

W. A. KOSKEN 1,673,252

ART OF MOTION PICTURES

Original Filed Sept. 13, 1924   7 Sheets-Sheet 7

INVENTOR.
Wilho A Kosken
BY Jas. H. Griffin
ATTORNEYS.

Patented June 12, 1928.

1,673,252

UNITED STATES PATENT OFFICE.

WILHO A. KOSKEN, OF RICHMOND HILL, NEW YORK, ASSIGNOR TO STEADYLITE MOTION PICTURE MACHINE CORPORATION.

ART OF MOTION PICTURES.

Application filed September 13, 1924, Serial No. 737,473. Renewed November 25, 1927.

This invention relates to the art of motion pictures and more particularly to the taking and projection of such pictures through the use of apparatus embodying movable primary and secondary series of deflectors adapted to cooperate with a beam of light passing between a film and an objective and vice versa to bend the beam while maintaining constant focal length.

A machine of this general character forms the subject matter of my pending application, Serial No. 716,867, filed May 31, 1924. In said prior application, the construction is such that the angle of incidence which the beam makes with the deflectors of one series is equal to substantially one half the angle of incidence which the reflected beam makes with the deflectors of the other series or vice versa. I have discovered that certain conditions result from the making of the ratio between these angles of incidence other than two to one or one to two and have evolved mathematical formulas whereby when the angle of incidence which the beam makes with the deflectors of one series is decided upon, the corresponding angle of incidence which the beam should make with the deflectors of the other series can be accurately computed. I have found that by following these formulas in the design of motion picture apparatus focal length may be decreased and thus give a more compact and smaller machine than results from following the two to one ratio to which I have referred.

In practising the present invention, the angle of incidence which the beam is to make with the deflectors of one series is first decided upon, and by thereafter following the formulas of the invention, I am enabled to accurately ascertain what angle of incidence the beam should make with the deflectors of the other series in order to maintain constant focal length. Having determined these two angles of incidence, I am able to accurately compute, mathematically, other details of design such as direction of travel of the respective series of deflectors, as well as the position of the film and its direction of movement, together with the spacing of the deflectors of each series at proper distance apart in such series, as well as other important details which are essential to the correct designing of an optical machine.

Features of the invention, other than those specified, will be apparent from the hereinafter detailed description and claims, when read in conjunction with the accompanying drawings.

The accompanying drawings illustrate different practical embodiments of the invention, but the constructions therein shown are to be understood as illustrative, only, and not as defining the limits of the invention.

Figure 1:
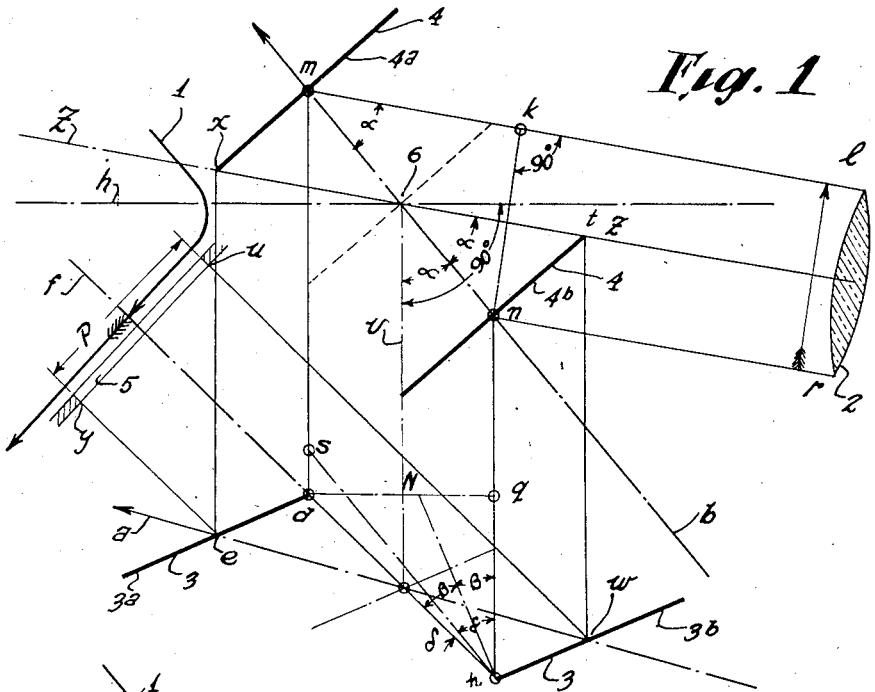
Figure 1 is an optical diagram showing a beam of light passing between a film and an objective and bent twice during such passage through cooperation of primary and secondary series of deflectors. In this view, the deflectors are shown in positions wherein two of the primary deflectors are cooperating with two of the secondary deflectors in the transmission of such beam.
Figure 2:
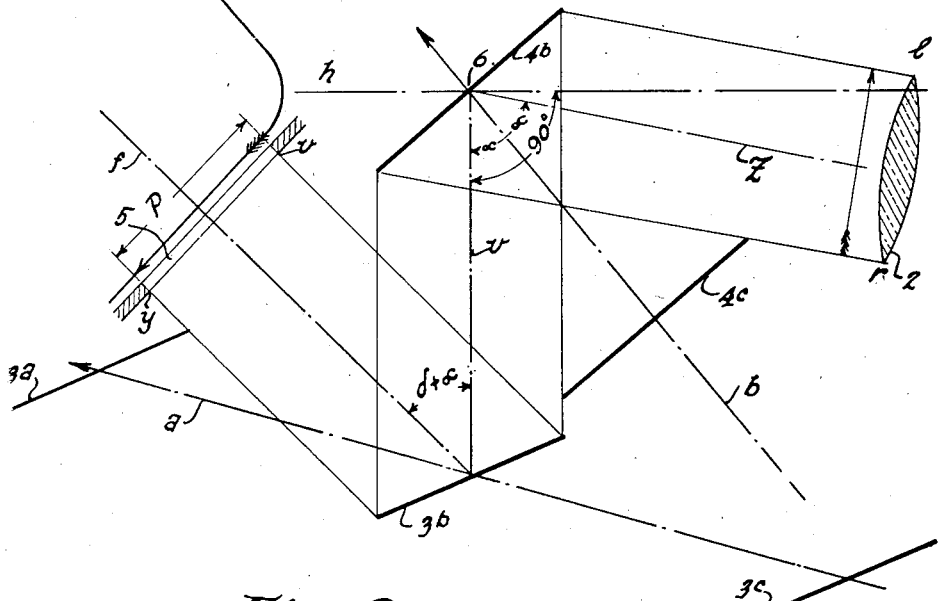
Figure 2 is a view similar to Figure 1, except that as here shown, the deflectors have moved so that a single primary deflector and a single secondary deflector suffice to bend the beam during its passage between the film and objective.
Figure 3:
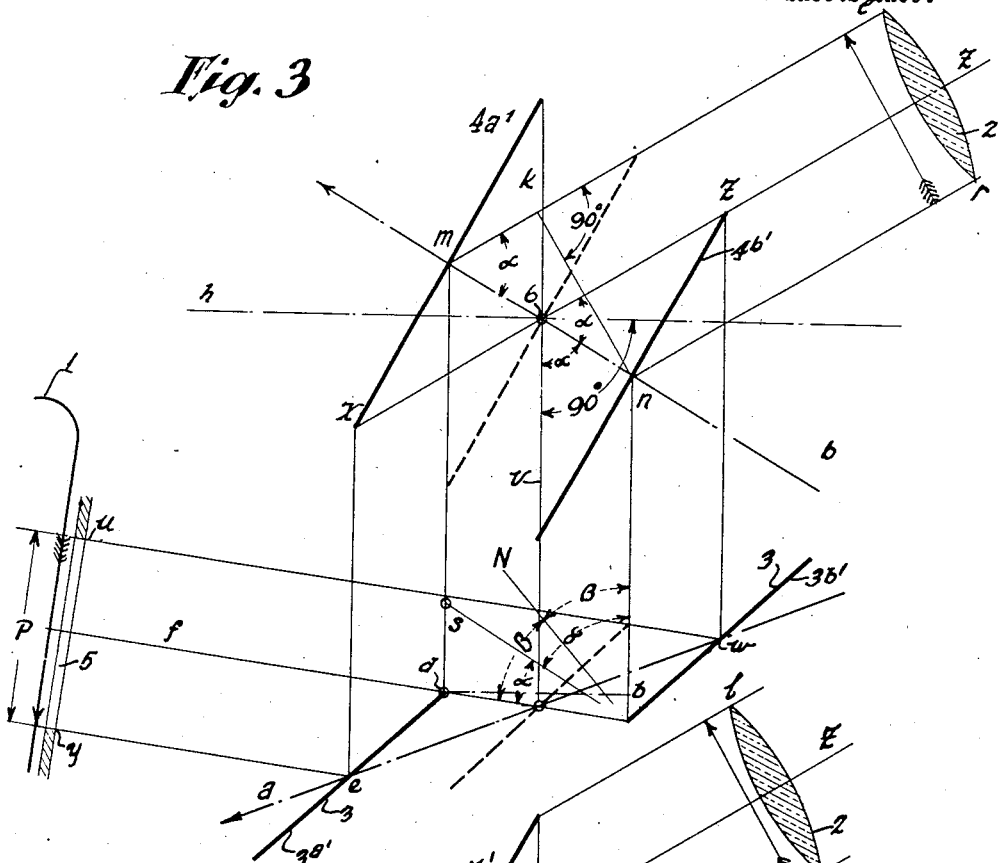
Figure 4:
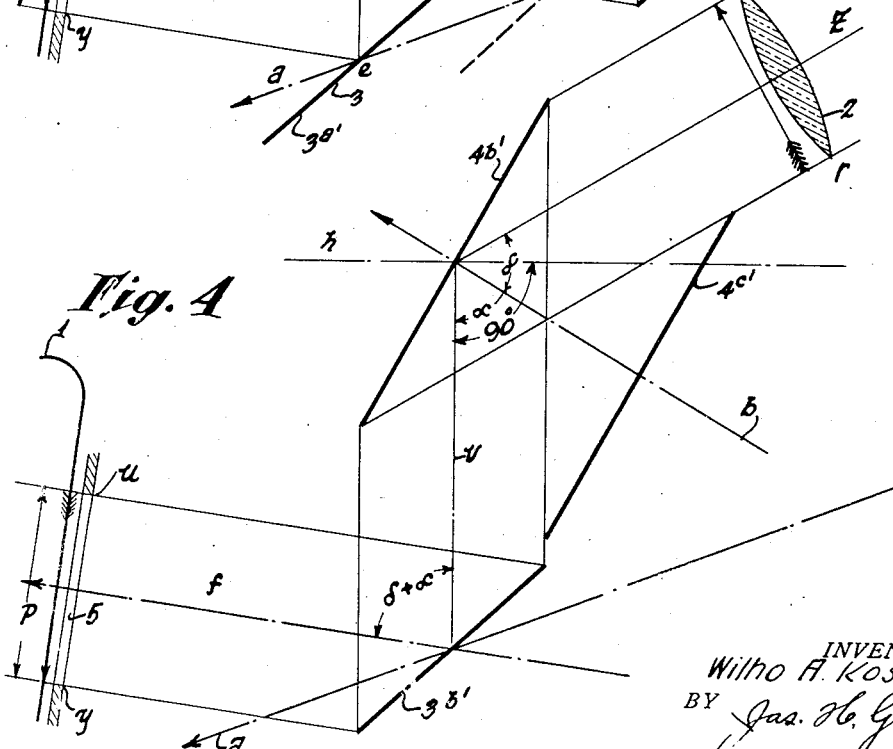

Figures 3 and 4 correspond in their showings to Figures 1 and 2, but illustrate optical arrangements wherein the angles of incidence which the beam makes with the primary series of deflectors and with the secondary series of deflectors bear a different ratio than is the case in Figures 1 and 2.

Figure 5:
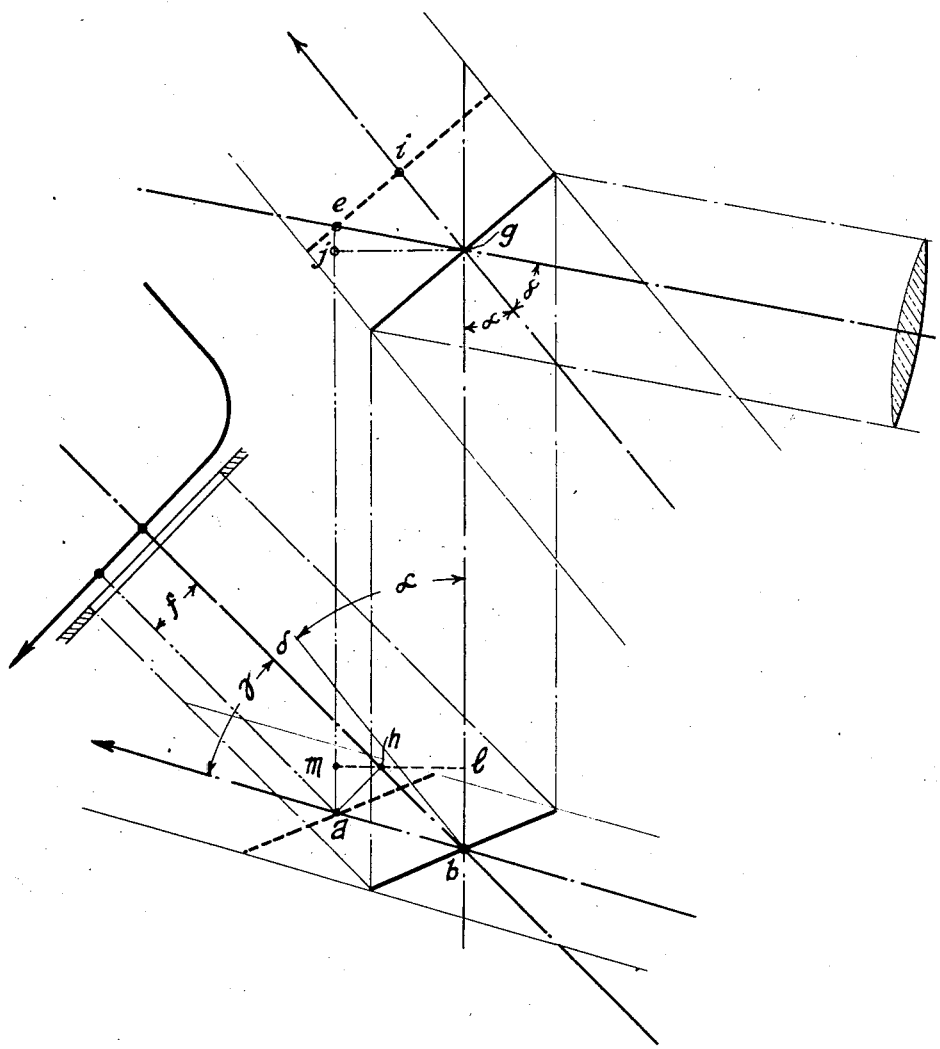
Figure 6:
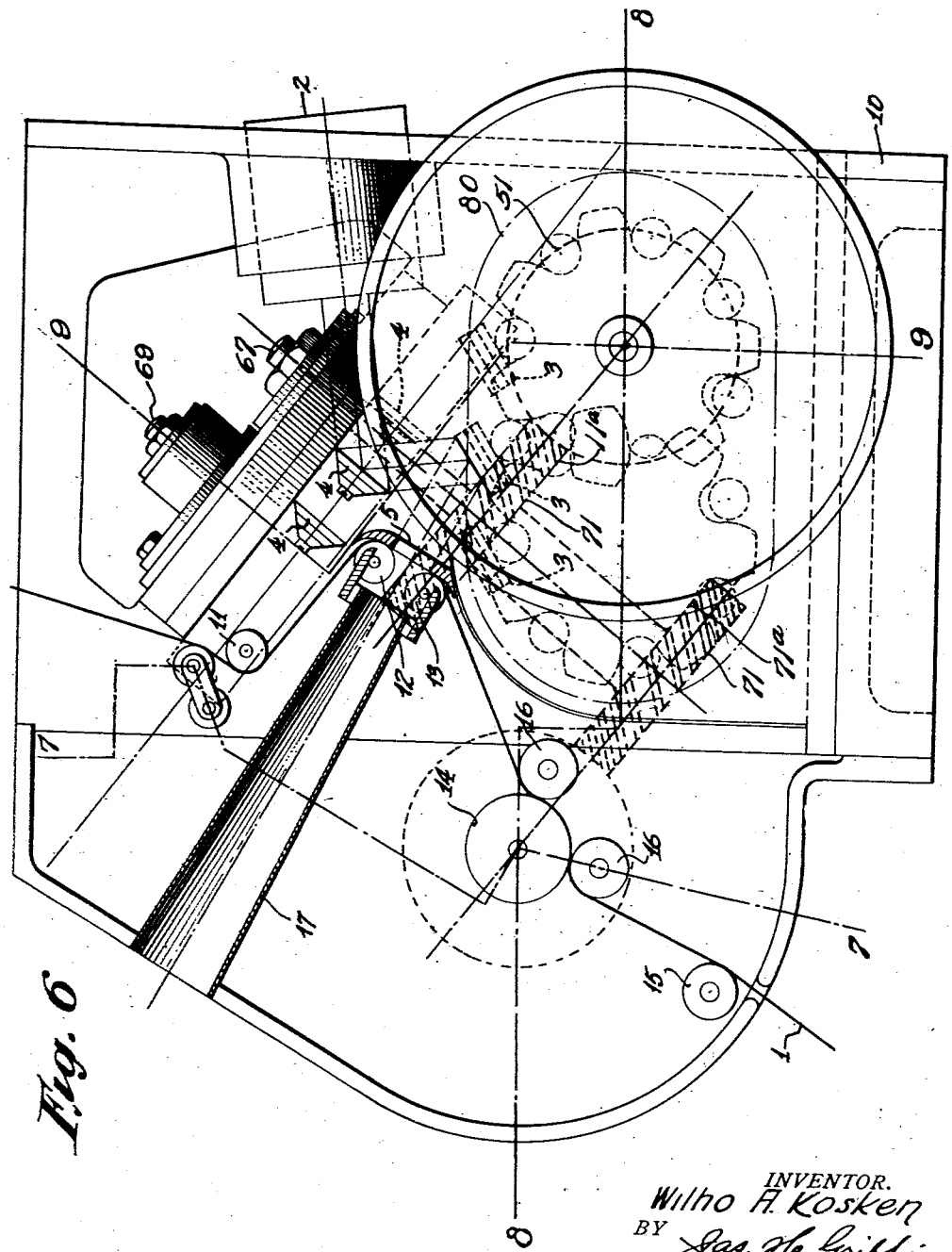

Figure 5 is an additional optical diagram wherein angular relationships between the deflectors of the primary and secondary series are the same as in Figures 1 and 2, but the deflectors are shown in different positions of their travel in this figure;

Figure 6 shows illustrative mechanism, partly in section and partly in elevation, for manipulating the deflectors of the primary and secondary series shown in Figures 1 to 5, inclusive.

Figure 7:
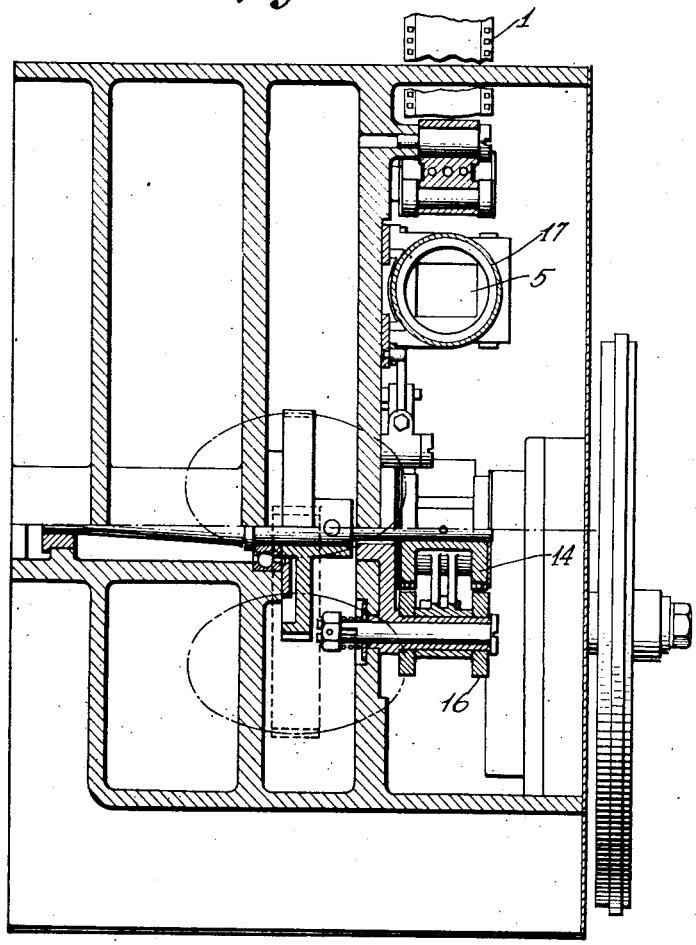

Figure 7 is a section on the broken line 7—7 of Figure 6.

Figure 8:
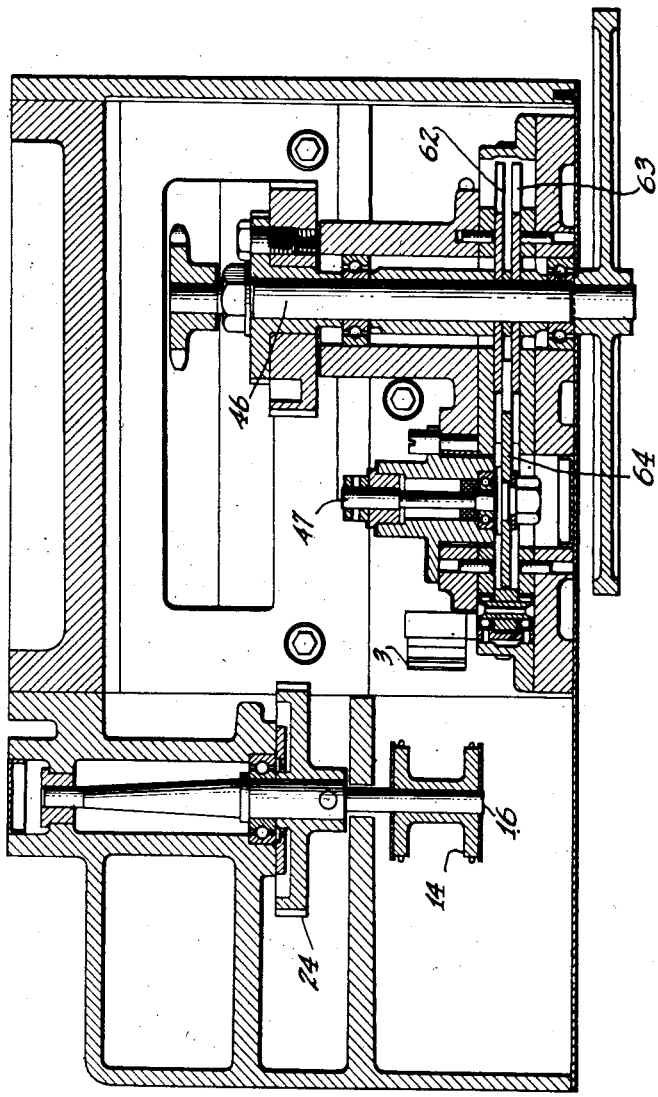
Figure 9:
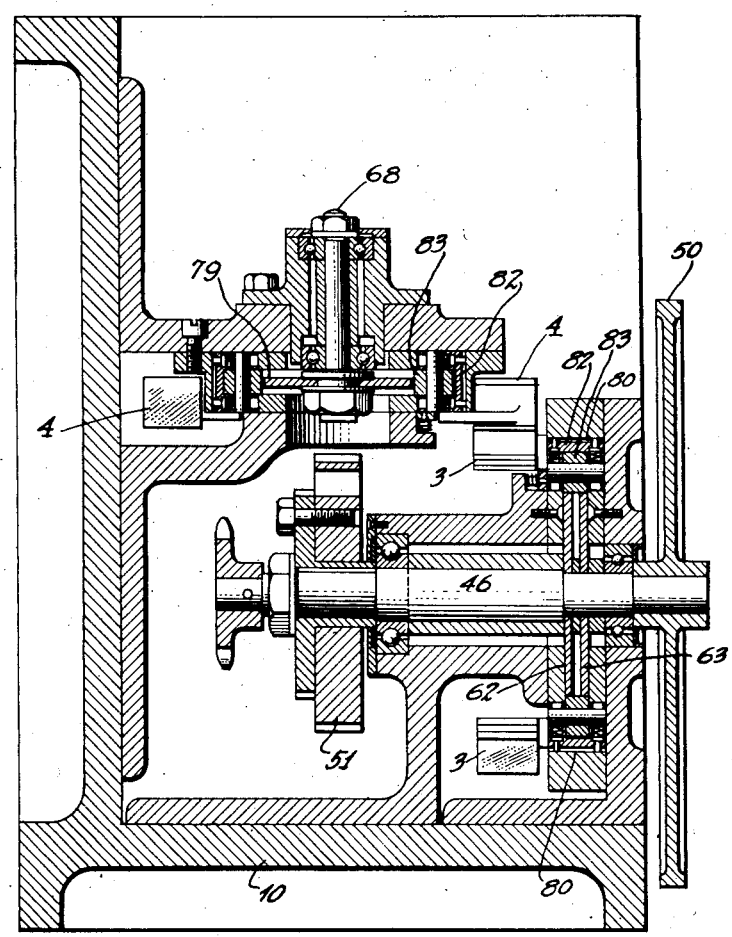

Figure 8 is a section on the broken line 8—8 of Figure 6; and,

Figure 9 is a section on the broken line 9—9 of Figure 6.

In order to make the invention clearly understood and to show the manner in which the formula of this invention may be applied, I will describe, in detail, one optical system shown in the accompanying drawings, by showing the manner in which said optical diagram is laid out and, by thereafter computing the angles, will prove the formula and show the manner in which it may be applied in the designing of a machine.

Referring to the drawings, 1 designates a motion picture film which may in practice be a sensitized film adapted for exposure or a developed film ready for projection. 2 designates an objective lens of any approved or appropriate type, mounted in stationary position relative to the continuously moving film. 3 denotes the deflectors of the primary series, of which two are shown and are numbered respectively $3^a$ and $3^b$ in Figures 1 and 2 and $3^{a\prime}$ and $3^{b\prime}$ in Figures 3 and 4. 4 are the deflectors of the secondary series of which two, designated $4^a$ and $4^b$ are shown in Figures 1 and 2 and $4^{a\prime}$ and $4^{b\prime}$ are shown in Figures 3 and 4.

5 is the film gate or aperture through which a beam of light, from any suitable source, is projected through the film and is adapted to impinge upon the deflectors of the primary series in succession to be deflected by them upon the deflectors of the secondary series, whence it is deflected through the objective. For the purpose of graphic description, the beam of light which is projected from such suitable source through the film and aperture as stated, will be hereinafter termed the "emitted beam."

I will now describe the manner in which the optical diagram shown in Figure 1 is laid out.

A line $h$ is first drawn, this line being termed the horizontal line. At any suitable point in this line, e. g., at the point 6, is erected a perpendicular $v$ which may be termed the vertical line. If desired, I may omit the horizontal line $h$ and start with the line $v$.

Given the angle $\alpha$ as the angle of incidence and reflection of the deflectors of the secondary series, which angle may be of any appropriate degree, a line $b$ is drawn through the point 6 making an inscribed angle between the lines $v$ and $b$ equal to the angle $\alpha$. The line $b$ lies in a plane common to the plane occupied by the lines $h$ and $v$ and this plane may be said to constitute a common plane of the diagram.

Another line Z is next passed through the point 6, so as to lie in the common plane, making an angle with the line $b$ also equal to the angle $\alpha$ and this line Z constitutes the principal axis of the objective and, as shown in the diagrams, passes directly through the center of the objective lens 2. This line locates the position of the lens.

In the motion picture art, the word "pitch" is applied to a film to designate the distance between the center of one exposure on the film, to the center of the next exposure, and this distance is designated in the diagrams by the reference character P and corresponds, substantially, to the length of the aperture 5.

Two lines $ml$ and $nr$ are now drawn parallel to the line Z, the former being above the line Z and the latter below, and they are spaced equidistant from the line Z a distance equal to $\frac{P}{2}$. The line $kn$, drawn normal to Z, is equal in length to the distance P.

The line $nr$ intersects the line $b$ at the point $n$ and this locates the deflector $4^b$ which is drawn through the point $n$ perpendicular to the line $b$. The line $ml$ intersects the line $b$ at $m$, thereby locating the deflector $4^a$, which is drawn perpendicular to $b$ through this point. The length of the deflectors 4 is fixed by their point of intersection with the lines $v$ and Z.

Thus, we have ascertained definitely the relationship between the objective and the deflectors of the secondary series, their direction of movement, viz, $mn$, the angle of incidence and reflection, the length of said deflectors and their spacing longitudinally of the direction of their travel. In other words, the relative positions and direction of movements of the deflectors of the secondary series have been located with respect to the objective.

The deflectors of the primary series are next located with respect to the foregoing and to the film in the following manner:

From $n$ a line is drawn parallel to $v$ to a point $p$, the distance $np$ being any suitable distance, but sufficient so that the deflectors of the primary and secondary series will clear one another during operation of the apparatus. It is desirable however that this distance be as small as feasible. Through the point $p$, the line $sp$ is drawn parallel to the line $b$ and the point $s$ is positioned in a line $ms$ drawn from the point $m$ parallel to the lines $v$ and $np$. Inasmuch as the line $sp$ is parallel to the line $b$ and the line $v$ parallel to the line $np$, the angle $spn$ will be equal to the angle $\alpha$ (opposite angles of a parallelogram). Now through the point $p$, I draw another line $f$, which line makes a greater angle with the line $np$ than the angle $\alpha$ and the difference between this angle and the angle $\alpha$ I term the angle $\delta$. This line $f$ will intersect the projected line $ms$ at $d$ and, if a line $dq$ is drawn from the point $d$ perpendicularly to the line $np$, this line will be equal in length to the pitch of the film viz, the distance P.

The line $f$ which has been drawn constitutes the axis of the emitted beam of light and accurately locates the position of the aperture 5 and direction of movement of the film, since, manifestly, the film must travel perpendicular to the axis of the light beam.

Having found the position of the film, the aperture and the axis of the emitted beam, I am now able to definitely locate the deflectors of the primary series, the direction of movement and their spacing apart. Inasmuch as the diagram shown in Figure 1 illustrates the beam as impinging two deflectors of different series evenly, the position of the deflector $3^b$ may be determined by drawing a vertical line from the point $t$ where the deflector $4^b$ intersects the line Z. A line is now drawn, parallel to the line $f$, from a point $u$, at the upper end of the aperture, and extended to intersect at $w$, with the line dropped from the point $t$. Where the deflector $4^a$ meets the line Z, viz, at $x$, a line is drawn parallel to the line $v$ and intersects at $e$, another line $ye$, drawn from the lower end of the aperture and parallel to the line $f$. These points $w$ and $e$ determine the centers of two adjacent primary deflectors and if a line $a$ is drawn through these points, this line will show the direction of travel of the deflectors of the primary series.

Inasmuch as $f$ denotes the axis of the emitted beam, which will impinge the deflectors $3^a$ and $3^b$, and since the beam must leave these deflectors in a direction parallel to the line $v$, the line $Np$ drawn to bisect the angle $dpq$ will be normal to the reflecting surface of the deflector $3^b$ as the angle of incidence is the angle $dpN$ while $Npq$ is the angle of reflection. These angles, being equal to each other are each designated $\beta$; $2\beta$ minus $\delta$ equals angle $\alpha$, the angle of incidence and reflection of the deflectors of the secondary series. If, therefore, a line is drawn through the point $w$ and normal to the line $Np$, this line will give the inclination of the deflector $3^b$. By drawing a parallel line through the point $e$, the inclination of the deflector $3^a$ is shown. Since these deflectors must be at least equal in length to the pitch of the film, the line $f$ will show the distance which the deflector $3^a$ must project to one side of the line $a$ and the distance which the deflector $3^b$ must project to the other side of said line. By laying off corresponding distances on the opposite sides of the line $a$, the other ends of the deflectors may be accurately found. The same result may be accomplished by drawing lines parallel to the line $a$ through the points $d$ and $p$.

As thus laid out, it is found that the focal length of the beam between the film and the objective is constant and a machine thus designed will give highly satisfactory results in taking or projecting motion pictures.

It will be noted however that in designing a machine care must be taken to determine the angle $\delta$ since this angle $\delta$ plus the angle $\alpha$ will give the sum of the angles of incidence and reflection which the beam must make with the lower series of deflectors in order that the primary and secondary series of deflectors may properly cooperate. I have found by careful study and experimentation that this angle $\delta$ may be mathematically ascertained. In this connection, attention is directed to Figure 5 of the drawings wherein I have shown the deflectors in intermediate positions from those shown in Figures 1 and 2. In this figure all unnecessary lines and reference characters are omitted and the showing simplified to facilitate explanation of the mathematical proofs.

P = Pitch of film.

The time required for one deflector to be replaced by its next adjacent one of the same set is the deflector spacing (pitch) divided by its velocity.

Letting the spacing of primary and secondary deflectors be $d_p$ and $d_s$, and the respective velocities be $Vp$ and $V_s$; then $$\frac{d_s}{V_s} = \frac{dp}{Vp}.$$

But the deflector spacing of the secondary set is (see Fig. 1)

$$d_s = \frac{P}{\sin \alpha},$$

and the spacing of the primary deflectors is $$dp = \frac{2P}{\sin(\gamma + \alpha + \delta)}.$$

Consequently the ratio of deflector velocities is $$\frac{Vp}{V_s} = \frac{2 \sin \alpha}{\sin(\gamma + \alpha + \delta)}.$$

Now assume the deflectors to have moved with their individual velocities for a time $t$ from the full line positions to the broken line positions as shown in Figure 5, and the film meanwhile has moved the distance $f$, then the shift of the film is to its pitch P as the movement of the primary deflectors is to its spacing $dp$.

$$\frac{f}{P} = \frac{ab}{dp} = \frac{ab \sin(\gamma + \alpha + \delta)}{2P},$$

and since $ab = Vpt$, $$f = \frac{Vpt}{2} \sin(\gamma + \alpha + \delta) = V_s t \sin \alpha.$$

It is necessary that the length of the light path during this movement be unchanged so that there shall be no impairment of focus or definition. Consequently making (drawing) $ah$ perpendicular to the light axis, $$ae+eg=hb+bg.$$

Since angle $egi=\alpha$, and since $ig=V_s t$, the rectangular components of $eg$ are $$je=eg \cos. 2\alpha=V_s t \frac{\cos. 2\alpha}{\cos \alpha},$$

and $$gj=eg \sin 2\alpha=V_s t \frac{\sin 2\alpha}{\cos \alpha},$$

because $$eg=\frac{V_s t}{\cos \alpha}.$$

Referring to Figure 5 and using equation $$ae+eg=hb+bg,$$

there results $$(am+mj+je)+eg=hb+(bl+lg);$$

but $$jm=gl,$$

$$je=V_s t \frac{\cos 2\alpha}{\cos \alpha},$$

$$eg=\frac{V_s t}{\cos \alpha},$$

$$bl=bh \cos (\alpha+\delta);$$

Therefore $$am+V_s t \frac{\cos 2\alpha}{\cos \alpha}+\frac{V_s t}{\cos \alpha}=bh[1+\cos(\alpha+\delta)]$$

Further $$am=ah \sin (\alpha+\delta)=f \sin (\alpha+\delta),$$

$$bh=\frac{hl}{\sin (\alpha+\delta)},$$

and $$hl=ml-mh=jg-ah \cos (\alpha+\delta)=jg-f \cos (\alpha+\delta);$$

whence $$f \sin (\alpha+\delta)+V_s t \frac{\cos 2\alpha}{\cos \alpha}+\frac{V_s t}{\cos \alpha}=$$
$$=\frac{1+\cos (\alpha+\delta)}{\sin (\alpha+\delta)}\left[V_s t \frac{\sin 2\alpha}{\cos \alpha}-f \cos (\alpha+\delta)\right].$$

Substituting $f=V_s t \sin \alpha$, and dropping $V_s t$ as a comon factor $$\sin (\alpha+\delta) \sin \alpha+\frac{\cos 2\alpha}{\cos \alpha}+\frac{1}{\cos \alpha}=$$
$$=\frac{1+\cos (\alpha+\delta)}{\sin (\alpha+\delta)}\left[\frac{\sin 2\alpha}{\cos \alpha}-\sin \alpha \cos (\alpha+\delta)\right]$$

Clearing fractions and collecting terms, $$\cos \alpha \sin \alpha+(\cos 2\alpha+1) \sin (\alpha+\delta)=$$
$$=\sin 2\alpha+(\sin 2\alpha-\sin \alpha \cos \alpha) \cos (\alpha+\delta),$$
$$2 \cos \alpha \sin (\alpha+\delta)=\sin \alpha [1+\cos (\alpha+\delta)],$$

and $$(1+\cos^2\alpha) \sin \delta-\sin \alpha+\cos \alpha \sin \alpha \cos \delta=0$$

The type of this equation is $$m \sin \delta-x+g \cos \delta=0;$$

squaring and solving $$(m^2+g^2) \cos^2 \delta-2 gx \cos \delta-m^2+x^2=0,$$

$$\cos \delta=\frac{gx+\sqrt{g^2 x^2+(m^2-x^2)(m^2+g^2)}}{m^2+g^2},$$

$$\cos \delta=\frac{gx+m\sqrt{m^2+g^2-x^2}}{m^2+g^2},$$

$$\cos \delta=\frac{\cos \alpha \sin^2\alpha+(1+\cos^2\alpha) 2 \cos \alpha}{1+3 \cos^2\alpha},$$

hence $$\cos \delta=\frac{\cos \alpha (3+\cos^2\alpha)}{1+3 \cos^2\alpha}$$

Herefrom $$\sin \delta=\sqrt{1-\frac{\cos^2\alpha (9+\cos^4\alpha+6 \cos^2\alpha)}{1+9 \cos^4\alpha+6 \cos^2\alpha}}$$
$$=\frac{\sqrt{1-3 \cos^2\alpha+3 \cos^4\alpha-\cos^6\alpha}}{1+3 \cos^2\alpha}=$$

Or $$\sin \delta=\frac{\sin^3\alpha}{1+3 \cos^2\alpha}.$$

Combining $$\cos \delta=\frac{\cos \alpha (3+\cos^2\alpha)}{1+3 \cos^2\alpha}$$

and $$\sin \delta=\frac{\sin^3\alpha}{1+3 \cos^2\alpha},$$

there results $$\tan \delta=\frac{\sin^3\alpha}{\cos \alpha (3+\cos^2\alpha)},$$

$$\tan \delta=\frac{\tan \alpha}{4 \csc^2\alpha-1}.$$

I thus have obtained three formulas, viz., $$\cos \delta=\frac{\cos \alpha (3+\cos^2\alpha)}{1+3 \cos^2\alpha},$$

$$\sin \delta=\frac{\sin^3\alpha}{1+3 \cos^2\alpha} \quad \text{and}$$

$$\tan \delta=\frac{\tan \alpha}{4 \csc^2\alpha-1}.$$

Additional formulæ giving the angle $\delta$ in terms of the co-tangent, co-secant, etc., might be employed but would all lead to the same end as the foregoing in enabling one to readily determine the size of the angle $\delta$, and with this knowledge accurate arrangement of the parts to effect proper cooperation is obtained.

The optical diagram shown in Figure 2 shows the same arrangement of parts as illustrated in Figure 1 except that in Figure 2, the deflectors are shown in intermediate positions from those illustrated in Figure 1, otherwise the arrangement is the same.

In Figures 1 and 2, the angle $\alpha$ is chosen less than 45 degrees whereas in the optical diagram of Figures 3 and 4, the angle $\alpha$ is greater than 45 degrees. The same formulæ apply to the diagram of Figures 3 and 4 as has been given for the diagram of Figures 1 and 2.

In carrying out the present invention, the optics involved may find practical embodiment in mechanism of widely differing construction, but for the purpose of illustration, I have chosen to show the invention as embodied in apparatus constructed as disclosed in my copending application, Serial No. 716,867 hereinbefore referred to. In Figures 6, 7, 8 and 9 apparatus having substantially the same structural characteristics as embodied in the copending application is shown.

In these figures, 1 designates the film, 2 the objective, 3 the deflectors of the lower or primary series and 4 the deflectors of the upper or secondary series. 5 is the film gate or aperture, and 10 is a suitable frame in which the parts are mounted. The film 1 is led about directional rolls 11, 12 and 13 to the feed roll 14 which, in practice, is a toothed roll, and from the feed roll passes about the directional roll 15 to the usual take-up reel. 16 designates tensioning rolls and serves to maintain the film in coperative relation with the drive roll 14 and at the same time properly tension the film and frame the picture. The emitted beam passes from a source of light exteriorly of the frame 10 through a light tube 17 through the film and through the aperture and is directed upon the deflectors of the primary series which deflect the beam upwardly on to the deflectors of the secondary series where it is bent and passed through the objective. The deflectors of the primary series are mounted to travel continuously and are operated by the mechanism which I will now proceed to describe.

It will be noted from Figures 6 to 9 that a spindle 46 is provided on one end of which is mounted a drive wheel 50 by means of which the spindle is driven. On this spindle is rigidly secured two disks 62 and 63 which, as shown in Figure 6 have toothed peripheries. Extending parallel with the spindle 46 is a second spindle 47 on which is fixed a sprocket disk 64 which extends in between the disks 62 and 63, as shown best in Figure 8. About the disks 62, 63 and 64 are arranged an endless train of followers 82, which are driven by the disks 62 and 63 and cooperate with a guide 80, as shown in Figures 6 and 9 to insure a true path of travel by these followers. Each follower is provided with a roller 83 which meshes with the teeth of the sprocket disks and by virtue of which the followers are driven. On each follower is mounted one of the deflectors 3, so that there are as many followers as there are deflectors of the lower series. When the driving wheel 50 is operated, the followers are caused to travel and the lower deflectors are moved along in an endless path, so as to approach, pass through and recede from the beam of light passing through the tube 17 and aperture 5. In this manner, the deflectors of the lower series successively cooperate with the beam to deflect the beam in an upward direction and cause it to impinge upon the deflectors of the upper series in succession.

The deflectors of the upper series are mounted in a manner very similar to the deflectors of the lower series. That is to say, each deflector 4 of the upper series is carried by a follower 82 which has a roller 83 cooperating with toothed disks in the same manner as described with reference to the lower movement. The single disk of the set is designated 79 and is shown in Figure 9. The spindle 68 corresponds to the spindle 47 of the lower movement and the spindle 68 corresponds to the spindle 46 of the lower movement. The spindle 67 carries thereon a wide-faced gear 71, the central portion of which is, in the interest of lightness, cut away as at 71A. One portion of the gear 71 meshes with a gear 51 fixed on the spindle 6, shown in Figure 9, while the other portion of the gear 71 meshes with the gear 24 which is fixed on and serves to drive the spindle 16 on which the film sprocket 14 is affixed.

It will thus be apparent that when rotation is imparted to the drive wheel 50, both the lower and upper movements are operated to the end that the beam of light passing through the aperture may be deflected by the deflectors of the lower series to impinge upon the deflectors of the upper series and by these latter deflectors the beam is again deflected through the objective lens 2.

Having thus fully described the invention, what I claim as new and desire to secure by Letters Patent is:

1. In the motion picture art, the method of securing substantially constant focal length in an optical machine embodying two series of movable deflectors adapted to successively bend a beam of light twice during its passage between the film and the objective lens, which consists in projecting the beam of light through the film, positioning the deflectors of one series to intercept the beam after it has passed through the film, at an angle of incidence $\alpha$, and positioning the deflectors of the other series of deflectors to intercept said beam, after it has been bent by the deflectors of the first series, at an angle of incidence $$\frac{\alpha+\delta}{2}$$

obtainable by applying the formula—

$$\tan \delta = \frac{\tan \alpha}{4^2 \csc^2 \alpha - 1},$$

and utilizing said deflectors of the second series to bend said beam and direct it through the objective lens.

2. In a motion picture art, the method of securing substantially constant focal length in an optical machine embodying two series of movable deflectors adapted to successively bend a beam of light twice during its passage between the film and the objective lens, which consists in positioning the deflectors of one series to intercept the beam of light, after it has passed through the film, at an angle of incidence $\alpha$ to thereby adapt said deflectors to bend the beam, then applying the formula—

$$\tan \delta = \frac{\tan \alpha}{4 \csc^2 \alpha - 1}$$

to ascertain an angle of incidence $$\frac{\alpha+\delta}{2}$$

for the deflectors of the second series, then positioning said deflectors of the second series to intercept the beam, after it has been bent by the deflectors of the first series, at the angle of incidence $$\frac{\alpha+\delta}{2}$$

and utilizing said deflectors of the second series to direct the beam thorugh the objective lens.

3. In an optical machine, the combination of a film mounted to travel, means for projecting a beam of light through the film, a series of deflectors mounted to travel in a path to successively intercept and bend the beam with an angle of incidence $\alpha$ after the beam has passed through the film, a second series of deflectors mounted to travel in a path to successively intercept the thus bent beam and further bend it with an angle of incidence of $$\frac{\alpha+\delta}{2},$$

wherein the tangent $\delta$ equals $$\frac{\tan \alpha}{4 \csc^2 \alpha - 1},$$

and an objective lens positioned to receive the beam after it has been bent by the deflectors of the secondary series.

4. In an optical machine, the combination of a film mounted to travel, means for projecting a beam of light through the film, a series of deflectors mounted to travel in a path to successively intercept and bend the beam with an angle of incidence $\alpha$ after the beam has passed through the film, a second series of deflectors mounted to travel in a path to successively intercept the thus bent beam and further bend it with an angle of incidence of $$\frac{\alpha+\delta}{2},$$

wherein the sin $\delta$ equals $$\frac{\sin^3 \alpha}{1 + 3 \cos^2 \alpha},$$

and an objective lens positioned to receive the beam after it has been bent by the deflectors of the second series.

5. In an optical machine, the combination of a film mounted to travel, means for projecting a beam of light through the film, a series of deflectors mounted to travel in a path to successively intercept and bend the beam with an angle of incidence $\alpha$ after the beam has passed through the film, a second series of deflectors mounted to travel in a path to successively intercept the thus bent beam and further bend it with an angle of incidence of $$\frac{\alpha+\delta}{2},$$

wherein the cosin $\delta$ equals $$\frac{\cos \alpha \, (3 + \cos^2 \alpha)}{1 + 3 \cos^2 \alpha},$$

and an objective lens positioned to receive the beam after it has been bent by the deflectors of the second series.

In testimony whereof I have signed the foregoing specification.

WILHO A. KOSKEN.